(12) United States Patent
Herzig

(10) Patent No.: US 8,304,568 B2
(45) Date of Patent: Nov. 6, 2012

(54) ORGANOPOLYSILOXANES HAVING POLYHYDROXYAMIDO GROUPS AND PREPARATION THEREOF

(75) Inventor: Christian Herzig, Waging (DE)

(73) Assignee: Wacker Chemie AG, Munich (DE)

( * ) Notice: Subject to any disclaimer, the term of this patent is extended or adjusted under 35 U.S.C. 154(b) by 159 days.

(21) Appl. No.: 12/671,602

(22) PCT Filed: Jul. 25, 2008

(86) PCT No.: PCT/EP2008/059762
§ 371 (c)(1),
(2), (4) Date: Feb. 1, 2010

(87) PCT Pub. No.: WO2009/019144
PCT Pub. Date: Feb. 12, 2009

(65) Prior Publication Data
US 2011/0190525 A1    Aug. 4, 2011

(30) Foreign Application Priority Data
Aug. 8, 2007 (DE) .................. 10 2007 037 360

(51) Int. Cl.
*C08G 77/388* (2006.01)

(52) U.S. Cl. ........ 556/413; 556/418; 556/419; 556/420; 556/422; 556/424

(58) Field of Classification Search .................. None
See application file for complete search history.

(56) References Cited

U.S. PATENT DOCUMENTS
6,958,410 B2    10/2005    Koch et al.

FOREIGN PATENT DOCUMENTS
WO    2006071772 A2    7/2006

OTHER PUBLICATIONS

Henkensmeier et al. Macromolecular Chemistry and Physics, 2004, 205, 1851-1857.*
Henkensmeier et al Macromolecular Chemistry and Physics, 2004, 205, 1851-1857.*
Wagner et al Applied organometallic chemistry, 1998, 12, 265-276.*
Dirk Henkensmeier et al., "Synthesis and Characterisation of Terminal Carbohydrate Modified Poly (dimethylsiloxane)s" Macromolecular Chemistry and Physics, 2004, vol. 205, pp. 1851-1857.

* cited by examiner

*Primary Examiner* — Yevegeny Valenrod
(74) *Attorney, Agent, or Firm* — Brooks Kushman P.C.

(57) ABSTRACT

Polyhydroxyamido group-containing polyorganosiloxanes contain from 20 to 90% of end groups which are polyhydroxyamido groups, and are free flowing.

10 Claims, No Drawings

ORGANOPOLYSILOXANES HAVING POLYHYDROXYAMIDO GROUPS AND PREPARATION THEREOF

CROSS-REFERENCE TO RELATED APPLICATION

This application is the U.S. national phase of PCT Appln. No. PCT/EP2008/059762 filed Jul. 25, 2008 which claims priority to German application DE 10 2007 037 360.2 filed Aug. 8, 2007.

BACKGROUND OF THE INVENTION

1. Field of the Invention

This invention relates to polyhydroxyamido-containing organopolysiloxanes and to a process for preparing them.

2. Description of the Related Art

U.S. Pat. No. 6,958,410 B2 describes amido-functional aminopolydiorganosiloxanes that have hydroxy carboxylic acids attached via the amido function. These linear siloxanes contain essentially lateral polyhydroxyamidoalkyl groups. They are used as softeners for textile finishing.

EP 1081272 describes polyol-functional linear siloxanes that additionally contain amino and/or amido groups, wherein the polyol groups are exclusively attached as lateral groups. These compounds are used as a textile finish to reduce the tendency to yellow in the course of processing compared with conventional softeners.

Polyhydroxysiloxanes are known from U.S. Pat. No. 4,591,652. They are synthesized by reacting silanes that bear amine-terminated substituents with aldonic acid lactone.

JP 62068820 A in turn describes in general terms the synthesis of organopolysiloxanes having saccharide residues from aminosiloxanes and saccharide lactones. They are used as primers on mineral and metallic surfaces.

EP 879 840 A is directed to linear organopolysiloxanes that contain polyhydroxy groups and polyether groups in the same molecule. These groups can each be attached to the siloxane chain in its lateral positions or else the terminal positions.

WO 2006/071772 discloses crosslinkable saccharide-siloxane compositions and also crosslinked formulations and coatings prepared therefrom. The α,ω-aminosiloxanes used as starting materials in the examples are 100% endblocked with amino groups. The polyhydroxy-functional saccharidesiloxanes obtained therewith are solid or have a wax-like or rubbery consistency.

SUMMARY OF THE INVENTION

It is an object of the present invention to provide polyhydroxyamido-containing organopolysiloxanes that contain radicals comprising hydroxyl groups, particularly sugar residues, and that are flowable. These and other objects are achieved by the invention, wherein the polyhydroxyamido organopolysiloxanes are prepared by reacting an amino-functional organopolysiloxane with a lactone of a hydroxycarboxylic acid containing at least two hydroxy groups.

DETAILED DESCRIPTION OF THE PREFERRED EMBODIMENTS

The present invention accordingly provides polyhydroxyamido-containing organopolysiloxanes of the general formula

  (I)

where
A represents a monovalent radical of the general formula

  (IIa)

and/or

  (IIb),

Z represents a monovalent organic radical which is substituted with 2 or more hydroxyl groups, preferably with 3 or more hydroxyl groups, and preferably represents a radical derived from hydroxy carboxylic acids or oxidized mono- or disaccharides that contain 2 or more hydroxyl groups, preferably 3 or more hydroxyl groups,
R represents a monovalent hydrocarbyl radical having 1 to 18 carbon atoms,
$R^1$ represents a divalent organic radical having 1 to 100 carbon atoms which may contain one or more separate oxygen atoms, and preferably represents a divalent hydrocarbyl radical having 1 to 18 carbon atoms,
$R^2$ represents a hydrogen atom or a monovalent hydrocarbyl radical having 1 to 18 carbon atoms,
$R^3$ represents a hydrogen atom or Z,
$R^4$ represents a divalent hydrocarbyl radical having 1 to 6 carbon atoms,
m is an integer from 1 to 500, preferably 10 to 100,
x is 0 or 1,
y is 0 or 1,
with the proviso that the sum x+y is on average 0.4 to 1.8 and thus there are an average of 20 to 90 mol % of the A radicals present as end groups.

The present invention further provides a process for preparing the polyhydroxyamido-containing organopolysiloxanes, which comprises reacting an amino-containing organopolysiloxane (1) of the general formula

  (III)

where
B represents a monovalent radical of the general formula

  (IVa)

and/or

  (IVb)

and
R, $R^1$, $R^2$, $R^4$, m, x and y are each as defined above, with the proviso that the sum x+y is on average 0.4 to 1.8 and thus an average of 20 to 90 mol % of the B radicals are present as end groups,
with a lactone (2) of a hydroxy carboxylic acid that contains 2 or more hydroxyl groups, preferably 3 or more hydroxyl groups.

The organopolysiloxanes of formula (I) according to the present invention have an average of 20 to 90 mol % of polyhydroxy groups A as end groups, which corresponds to an average sum x+y in formula (I) of 0.4 to 1.8.

The organopolysiloxanes of formula (I) according to the present invention preferably have an average of 30 to 80 mol % of polyhydroxy groups A as end groups, which corresponds to an average sum x+y in formula (I) of preferably 0.6 to 1.6.

The organopolysiloxanes of formula (I) according to the present invention more preferably have an average of 35 to 75 mol % of polyhydroxy groups A as end groups, which corresponds to an average sum x+y in formula (I) of more preferably 0.7 to 1.5.

The organopolysiloxanes of formula (I) according to the present invention contain two species of terminal siloxane units, namely siloxane units of the formula $AR_2SiO_{1/2}$ (with polyhydroxy group) and also siloxane units of the formula $R_3SiO_{1/2}$ (without polyhydroxy group), where R is preferably methyl.

The amino-containing organopolysiloxanes (1) used in the process of the present invention are not 100% end-blocked with amino groups, like the α,ω-aminosiloxanes described in examples 1 a) to c) of WO 2006/071772 A2.

The amino-containing organopolysiloxanes (1) of formula (III) used have an average of 20 to 90 mol %, preferably 30 to 80 mol % and more preferably 35 to 75 mol % of amino groups B as end groups, which corresponds to an average sum x+y in formula (III) of 0.4 to 1.8, preferably 0.6 to 1.6 and more preferably 0.7 to 1.5.

The organopolysiloxanes of formula (III) used contain two species of terminal siloxane units, namely siloxane units of the formula $BR_2SiO_{1/2}$ (with amino group) and also siloxane units of the formula $R_3SiO_{1/2}$ (without amino group). The two species of terminal siloxane units can form a random distribution, or form a distribution such that the siloxane chain of formula (III) contains exactly one terminal siloxane unit of formula $BR_2SiO_{1/2}$ and exactly one terminal siloxane unit of formula $R_3SiO_{1/2}$.

Examples of R radicals are alkyl radicals such as methyl, ethyl, n-propyl, isopropyl, 1-n-butyl, 2-n-butyl, isobutyl, tert-butyl, n-pentyl, isopentyl, neopentyl, tert-pentyl, hexyl such as n-hexyl, heptyl such as n-heptyl, octyl such as n-octyl and isooctyl such as 2,2,4-trimethylpentyl, nonyl such as n-nonyl, decyl such as n-decyl, dodecyl such as n-dodecyl, and octadecyl such as n-octadecyl; cycloalkyl radicals such as cyclopentyl, cyclohexyl, cycloheptyl and methylcyclohexyl; alkenyl radicals such as vinyl, 5-hexenyl, cyclohexenyl, 1-propenyl, allyl, 3-butenyl and 4-pentenyl; alkynyl radicals such as ethynyl, propargyl and 1-propynyl; aryl radicals such as phenyl, naphthyl, anthryl and phenanthryl; alkaryl radicals such as o-tolyl, m-tolyl, p-tolyl, xylyl and ethylphenyl; and aralkyl radicals such as benzyl, α-phenylethyl and β-phenylethyl.

Examples of halogenated R radicals are haloalkyl radicals such as 3,3,3-trifluoro-n-propyl, 2,2,2,2',2',2'-hexafluoroisopropyl, heptafluoroisopropyl, and haloaryl radicals such as o-chlorophenyl, m-chlorophenyl and p-chlorophenyl.

The R radical preferably comprises a monovalent hydrocarbyl radical having 1 to 6 carbon atoms, with methyl being particularly preferred.

$R^1$ preferably represents a divalent hydrocarbyl radical having 2 to 6 carbon atoms.

$R^4$ preferably represents a radical of the formula $-(CH_2)_k-$, where k is an integer from 1 to 6, preferably 2, 3 or 4.

The structural element Z in the formulae (IIa) and (IIb) preferably contains two or more hydroxyl groups, which are each attached to different carbon atoms. Preferably, Z contains 3 to 12 carbon atoms and 2 to 10 hydroxyl groups. Preferably, Z represents an organic radical having 3 to 12 carbon atoms which is derived from hydroxy carboxylic acids or oxidized mono- or disaccharides that contain 2 to 10 hydroxyl groups. More preferably, Z represents radicals derived from oxidized monosaccharides of the formulae

$HOCH_2-(CHOH)_d-CO-$

$O=CH-(CHOH)_d-CO-$

$HO_2C-(CHOH)_d-CO-$ where d is 2, 3, 4, 5, 6, 7, 8, 9 and 10.

These Z radicals derive from their underlying carboxylic acids as a result of the absence, in the carboxyl moiety, of the hydroxyl group which in these specific cases of Z linking with the nitrogen atom in formula (IIa) or (IIb) to form an amide combines with a hydrogen atom from the amino group of formulae (IVa) and (IVb), respectively, to formally form one mole of water of condensation.

Examples of carboxylic acids underlying the Z radicals are glyceric acid, mevalonic acid, gluconic acid, mannonic acid, 2-ketogulonic acid, galactaric acid, glucaric acid and also, with their cyclic structures, glucuronic acid, galacturonic acid and quinic acid.

The organopolysiloxanes (1) used in the process of the present invention contain as B radicals amino groups each having at least one active hydrogen atom per amino function. Since primary amino groups react faster and more completely with lactones (2) than do secondary amino groups, B radicals having primary amino groups are preferred.

Preferred examples of B radicals are:
$H_2N(CH_2)_3-$, $H_2NCH_2CH(CH_3)CH_2-$, $H_2N(CH_2)_2NH(CH_2)_3-$, $H_2N(CH_2)_2NHCH_2CH(CH_3)CH_2-$, (cyclohexyl)$NH(CH_2)_3-$, $CH_3NH(CH_2)_3-$, $CH_3CH_2NH(CH_2)_3-$, $CH_3NH(CH_2)_2NH(CH_2)_3-$, and $CH_3CH_2NH(CH_2)_2NH(CH_2)_3-$.

Preferred examples of terminal siloxane units of formula $BR_2SiO_{1/2}$ are aminopropyldimethylsiloxane units, aminoisobutyldimethylsiloxane units, aminoethylaminopropyldimethylsiloxane units and aminoethylaminoisobutyldimethylsiloxane units.

Examples of amino-containing organopolysiloxanes (1) are copolymers of aminopropyldimethylsiloxane, trimethylsiloxane and dimethylsiloxane units; of aminoisobutyldimethylsiloxane, trimethylsiloxane and dimethylsiloxane units; and of aminoethylaminopropyldimethylsiloxane, octyldimethylsiloxane and dimethylsiloxane units.

The amino-containing organopolysiloxanes (1) preferably have a viscosity of 10 to 100,000 mPa·s at 25° C., more preferably 10 to 10,000 mPa·s at 25° C., and preferably an amine concentration of 0.01 to 2.0 meq/g, more preferably 0.1 to 1.5 meq/g.

Preference is given to using lactones (2) of hydroxy carboxylic acids having 3 to 12 carbon atoms that contain 2 to 10 hydroxyl groups.

Examples of lactones (2) used in the process of the present invention are glucaro-1,4-lactone, glucono-1,5-lactone, glucurono-6,3-lactone, galactono-1,4-lactone, mannono-1,4-lactone, gulono-1,4-lactone, ascorbic acid and glucoascorbic acid.

The process of the present invention preferably utilizes lactone (2) in amounts of 0.5 to 1.2 mol, preferably 0.7 to 1.0 mol, per mole of primary (and as the case may be secondary) amino group in organopolysiloxane (1).

The reaction of amino-containing organopolysiloxane (1) with lactone (2) is preferably conducted at temperatures of 40 to 100° C., preferably 40 to 70° C. The reaction can be carried out at the pressure of the ambient atmosphere (about 1020 hPa) or else at higher or lower pressures.

The reaction can be carried out without dilution or else in the presence of organic solvents. Examples of organic solvents are alcohols such as methanol, ethanol, dodecanol, isotridecanol, 2-ethylhexanol, and Guerbet alcohols such as 2-butyloctanol, 2-hexyloctanol, 2-hexyldecanol, 2-octyldecanol, 2-hexyldodecanol or 2-octyldodecanol.

It is preferable for organic solvents to be used in the process of the present invention. Preference is given to using a 50% to an 80% by weight solution of amino-containing organopolysiloxane (1) in the solvent.

After the reaction, the organic solvent can be removed, preferably by distillation. When a mixture of solvents is used, preferably a mixture of a low boiler (solvent having a boiling point of preferably below 100° C., such as ethanol) and a high boiler (solvent having a boiling point of preferably above 150° C., such as dodecanol or isotridecanol), it is preferable to remove the low boiler and to leave the high boiler in the organopolysiloxane of the present invention as a viscosity regulator.

In the process of the present invention, the reaction of primary amino group with the lactone group proceeds spontaneously and usually requires no catalyst.

When the organic solvent is not removed, the polyhydroxyamido-containing organopolysiloxanes of the present invention are obtained as solutions in organic solvents that preferably contain 50% to 90% by weight of the organopolysiloxanes of the present invention.

Removing the solvent preferably provides highly concentrated solutions of polyhydroxyamido-containing organopolysiloxanes of the present invention in organic viscosity regulators that contain 70% to 95% by weight of the organopolysiloxanes of the present invention and yet are still free-flowing. These highly concentrated solutions containing 70% to 95% by weight of organopolysiloxanes of the present invention preferably have a viscosity of 1000 to 200,000 mPa·s at 25° C., more preferably 1000 to 50,000 mPa·s at 25° C., depending on the concentration of the organopolysiloxanes.

Example 1

300 g of a linear organopolysiloxane composed of aminopropyldimethylsiloxy, trimethylsiloxy and dimethylsiloxy units and having a viscosity of 20.4 mm²/s (25° C.) and an amine content of 0.704 meq/g (corresponding to 66 mol % of amino groups, sum x+y=1.32) are diluted with 83.5 g of dodecanol and 37 g of ethanol. After heating to about 50° C., 34 g of gluconolactone are added, and the mixture is further heated to 80° C. After about 3 hours, the cloudy mixture clarifies. The reaction is allowed to continue for a further 3 hours. The initially thin solution does become appreciably more viscous as it cools down, but is still liquid at 25° C. The amine content of the polymer solution is only 0.051 meq/g.

Example 2

300 g of a linear organopolysiloxane composed of aminopropyldimethylsiloxy, trimethylsiloxy and dimethylsiloxy units and having a viscosity of 18.2 mm²/s (25° C.) and an amine content of 0.550 meq/g (corresponding to 48 mol % of amino groups, sum x+y=0.96) are diluted with 36.5 g of isotridecanol and 36.5 g of ethanol and heated to 50° C. Then, 26.5 g of gluconolactone are added and the batch is heated to 80° C. After 105 minutes, the initially cloudy batch becomes homogeneous. After a further 3 hours, ethanol is removed in vacuo. The 90% polyhydroxyamidosiloxane solution is still liquid when warm, but becomes appreciably more viscous on cooling, yet remains still free-flowing at 25° C. The content of residual amine groups is 0.041 meq/g.

Comparative Example 1 as per WO 2006/071772

Example 2 is repeated by using 300 g of a linear organopolysiloxane formed from aminopropyldimethylsiloxy and dimethylsiloxy units (DMS-A21, Gelest Inc.) and having a 0.65% NH₂ content and 100% amine end-blocking. 36 g of ethanol and 36 g of isotridecanol are stirred in and the batch is heated to 50° C. After addition of 21.8 g of gluconolactone, the batch is further heated to 80° C. and maintained at that temperature for 5 hours. The removal of ethanol in vacuo provides a 90% polyhydroxyamidosiloxane solution, which substantially solidifies as it cools to form a wax-like solid mass at 27° C. The content of residual amine groups is 0.032 eq/g.

Whereas the polyhydroxyamido-containing organopolysiloxane of the present invention is a free-flowing liquid, the 100% endblocked organopolysiloxane obtained as per WO 2006/071772 is solid.

Example 3

240 g of a linear organopolysiloxane composed of aminoethylaminopropyldimethylsiloxy, trimethylsiloxy and dimethylsiloxy units and having a viscosity of 41.8 mm²/s (25° C.) and an amine content of 0.623 meq/g (corresponding to 52 mol % of aminoethylaminopropyl end groups, sum x+y=1.04) are diluted with 28 g of isotridecanol and 28 g of ethanol and heated to 50° C. After addition of 13.5 g of gluconolactone, the very cloudy mixture is heated to 80° C. After 145 minutes, a clear solution is obtained, and allowed to react for a further 3 hours. Ethanol is removed at 60° C. in vacuo. The resulting 90% polyhydroxyamidosiloxane solution has at 25° C. a viscosity of 19 200 mm²/s and a secondary amino group content of 0.266 meq/g.

Comparative Example 2 as per U.S. Pat. No. 6,958,410 B2

The 240 g of the linear organopolysiloxane in example 3 are replaced by an amine oil consisting of aminoethylaminopropylmethylsiloxane and dimethylsiloxane units having methoxy and hydroxy end groups, a nitrogen content of 0.6% and a viscosity of 3180 mPa·s at 25° C. that has lateral amino groups only. An equivalent organopolysiloxane is used in all operative examples of U.S. Pat. No. 6,958,410 B2. The siloxane is heated to 50° C. together with 27.7 g of isotridecanol and 27.7 g of ethanol. 9.2 g of gluconolactone are added with stirring, which corresponds to the stoichiometric amount of primary amino groups, followed by heating to 80° C. for 6 hours. Removing the ethanol at 60° C. in vacuo and cooling to 25° C. gives a slightly cloudy solid mass even though the nitrogen content of the starting material and hence also the hydroxyl concentration in the reaction product only amounts to about 70% of the organopolysiloxane of inventive example 3.

Whereas the polyhydroxyamido-containing organopolysiloxane of the present invention is a free-flowing liquid, the organopolysiloxane obtained as per U.S. Pat. No. 6,958,410 B2, having lateral polyhydroxyamido groups only, is solid.

What is claimed is:

1. Flowable polyhydroxyamido-containing organopolysiloxanes of the formula

where

A represents a monovalent radical of the formulae

or

Z represents a radical derived from a hydroxy carboxylic acid or lactone thereof, or an oxidized mono- or disaccharide that contains 2 or more hydroxyl groups, R represents a monovalent, optionally halogenated hydrocarbyl radical having 1 to 18 carbon atoms, $R^1$ represents a divalent organic radical having 1 to 100 carbon atoms which may contain one or more non-adjacent oxygen atoms, $R^2$ represents a hydrogen atom or a monovalent hydrocarbyl radical having 1 to 18 carbon atoms, $R^3$ represents a hydrogen atom or Z, $R^4$ represents a divalent hydrocarbyl radical having 1 to 6 carbon atoms, m is an integer from 1 to 500, x is 0 or 1, y is 0 or 1, with the proviso that the sum x+y is on average 0.4 to 1.8 and thus there are an average of 20 to 90 mol % of the A radicals present as end groups.

2. The organopolysiloxane of claim 1, wherein radical Z contains 3 or more hydroxyl groups.

3. The polyhydroxyamido-containing organopolysiloxane of claim 1, wherein Z represents a radical derived from a hydroxy carboxylic acid lactone.

4. The polyhydroxyamido-containing organopolysiloxane of claim 1, wherein Z represents a radical selected from the group consisting of the formulae HOCH$_2$—(CHOH)$_d$—CO—, O=CH—(CHOH)$_d$—CO—, and HO$_2$C—(CHOH)$_d$—CO—, where d is 2, 3, 4, 5, 6, 7, 8, 9 or 10.

5. The polyhydroxyamido-containing organopolysiloxane of claim 1, wherein solutions in organic solvents that contain 70% to 95% by weight of polyhydroxyamido-containing organopolysiloxane have a viscosity of 1000 to 200,000 mPa·s at 25° C.

6. A process for preparing a polyhydroxyamido-containing organopolysiloxane of claim 1, comprising reacting an amino-containing organopolysiloxane (1) of the formula $$B_xR_{3-x}SiO(SiR_2O)_mSiR_{3-y}B_y \quad (III)$$

where

B represents a monovalent radical of the formula $$-R^1-NH(R^2) \quad (IVa)$$

and/or $$-R^1-NH-R^4-NH(R^2) \quad (IVb),$$

with the proviso that the sum x+y is on average 0.4 to 1.8 and thus an average of 20 to 90 mol % of the B radicals are present as end groups, with a lactone (2) of a hydroxy carboxylic acid that contains 2 or more hydroxyl groups.

7. The process of claim 6, wherein the B radical is an aminopropyl, aminoisobutyl, aminoethylaminopropyl or aminoethylaminoisobutyl radical.

8. The process of claim 6, wherein the lactone (2) is selected from the group consisting of glucaro-1,4-lactone, glucono-1,5-lactone, glucurono-6,3-lactone, galactono-1,4-lactone, mannono-1,4-lactone, gulono-1,4-lactone, ascorbic acid and glucoascorbic acid.

9. The process of claim 6, wherein reacting is effected in the presence of an organic solvent.

10. The process of claim 6, wherein reacting is effected in the presence of a low boiling organic solvent and a high boiling organic solvent, low boiling organic solvent is removed, and at least some high boiling solvent remains and acts as a viscosity regulator.

* * * * *